US012723719B2

(12) United States Patent
Rau et al.

(10) Patent No.: US 12,723,719 B2
(45) Date of Patent: Sep. 1, 2026

(54) SHUT-OFF VALVE, AND HYDROGEN TANK SYSTEM COMPRISING A SHUT-OFF VALVE

(71) Applicant: Robert Bosch GmbH, Stuttgart (DE)

(72) Inventors: Andreas Rau, Stuttgart (DE); Udo Schaich, Stuttgart (DE); Joachim Soubari, Ettlingen (DE)

(73) Assignee: Robert Bosch GmbH, Stuttgart (DE)

( * ) Notice: Subject to any disclaimer, the term of this patent is extended or adjusted under 35 U.S.C. 154(b) by 53 days.

(21) Appl. No.: 18/730,057

(22) PCT Filed: Dec. 27, 2022

(86) PCT No.: PCT/EP2022/087880

§ 371 (c)(1),
(2) Date: Jul. 18, 2024

(87) PCT Pub. No.: WO2023/143845

PCT Pub. Date: Aug. 3, 2023

(65) Prior Publication Data

US 2025/0116379 A1 Apr. 10, 2025

(30) Foreign Application Priority Data

Jan. 25, 2022 (DE) ..................... 10 2022 200 799.9

(51) Int. Cl.
*F17C 13/04* (2006.01)

(52) U.S. Cl.
CPC ...... *F17C 13/04* (2013.01); *F17C 2205/0326* (2013.01); *F17C 2221/012* (2013.01);
(Continued)

(58) Field of Classification Search
None
See application file for complete search history.

(56) References Cited

U.S. PATENT DOCUMENTS

| | | | | |
|---|---|---|---|---|
| 6,675,831 | B2 | 1/2004 | Sakaguchi et al. | |
| 11,649,906 | B2 * | 5/2023 | Park .................... | F16K 31/0655 251/129.15 |

(Continued)

FOREIGN PATENT DOCUMENTS

| | | | |
|---|---|---|---|
| DE | 2315325 | A1 | 10/1973 |
| DE | 19632803 | A1 | 2/1997 |

(Continued)

OTHER PUBLICATIONS

Translation of International Search Report for Application No. PCT/EP2022/087880 dated May 11, 2023 (2 pages).

*Primary Examiner* — Paul J Gray
(74) *Attorney, Agent, or Firm* — Michael Best & Friedrich LLP

(57) ABSTRACT

The invention relates to a shut-off valve (1) for hydrogen tank systems, comprising a housing (2) in which an annular solenoid (3) is accommodated for acting on a magnetic armature (4) of a control valve (5) in the form of a flat armature and a magnetic armature (6) of a main valve (7) in the form of a plunger-type armature, wherein the two magnetic armatures (4, 6) are arranged coaxially and together they border a control chamber (8) formed within the solenoid (3), which is pneumatically connected to a control valve chamber (9) on one side and to a main valve chamber (10) on the other side, and wherein at least one spring (11, 12) is accommodated in the control chamber (8) for restoring the two magnetic armatures (4, 6).
The invention also relates to a hydrogen tank system comprising a shut-off valve (1) according to the invention.

9 Claims, 4 Drawing Sheets

(52) U.S. Cl.
CPC ................. *F17C 2270/0178* (2013.01); *F17C 2270/0184* (2013.01)

(56) References Cited

U.S. PATENT DOCUMENTS

| | | | | |
|---|---|---|---|---|
| 2005/0061302 | A1 | 3/2005 | Tatsu et al. | |
| 2006/0283510 | A1* | 12/2006 | Pechtold | F16K 1/44 137/625.5 |
| 2014/0239207 | A1 | 8/2014 | Ninomiya et al. | |
| 2015/0184805 | A1 | 7/2015 | Lee | |
| 2018/0038507 | A1 | 2/2018 | Ninomiya et al. | |

FOREIGN PATENT DOCUMENTS

| | | | |
|---|---|---|---|
| DE | 19731402 | A1 | 1/1999 |
| DE | 102007005916 | A1 | 8/2008 |
| DE | 102013223470 | A1 | 5/2014 |
| DE | 102018221600 | A1 | 6/2020 |
| JP | 2003090499 | A | 3/2003 |
| JP | 2013053660 | A | 3/2013 |
| JP | 2014163465 | A | 9/2014 |
| WO | 2020158728 | A1 | 8/2020 |

* cited by examiner

Fig. 2 a) b) c)
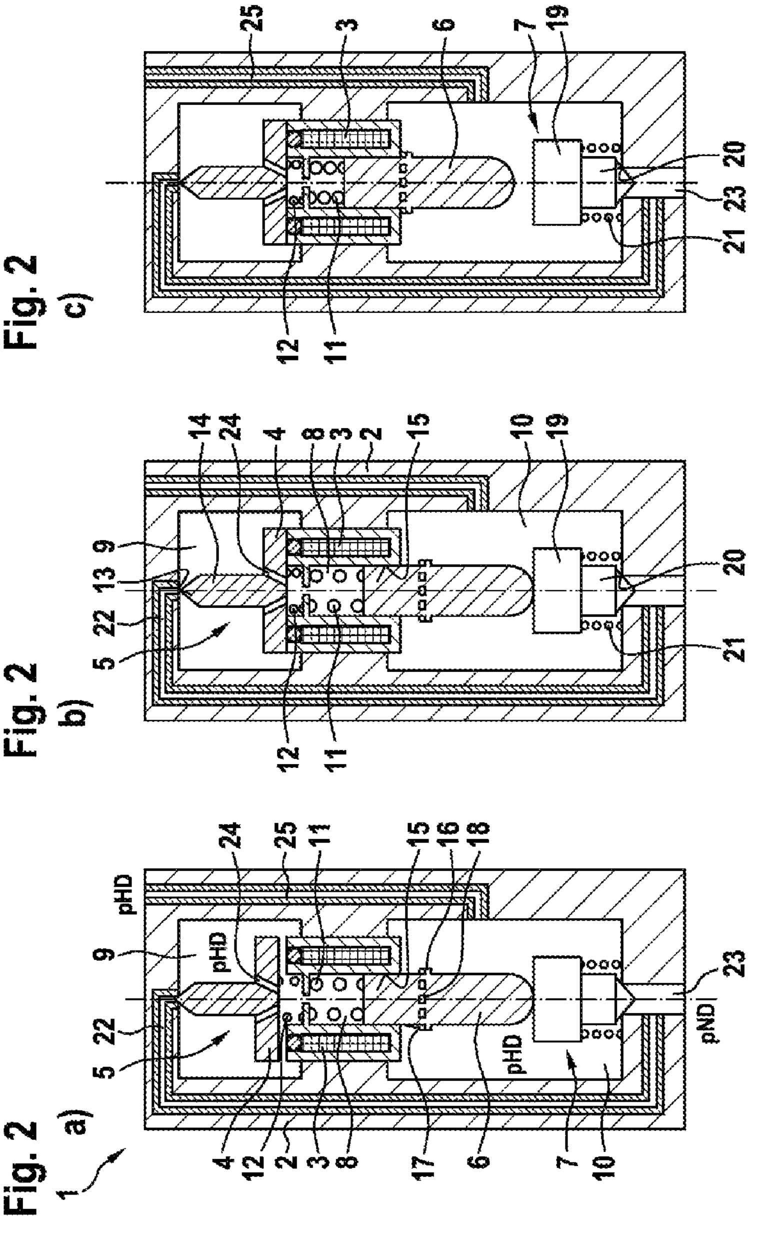

SHUT-OFF VALVE, AND HYDROGEN TANK SYSTEM COMPRISING A SHUT-OFF VALVE

BACKGROUND

The invention relates to a shut-off valve for hydrogen tank systems. The invention also relates to a hydrogen tank system comprising a shut-off valve according to the invention.

Hydrogen tank systems for motor vehicles or mobile hydrogen tank systems that serve to supply hydrogen to fuel cells or internal combustion engines are known. In the event of a failure, e.g. a line breakage or an accident, the individual containers of a hydrogen tank system must each be closable by means of a shut-off valve to prevent uncontrolled leakage of hydrogen. The shut-off valves used must therefore be designed as non-powered, self-acting valves.

Non-powered, self-acting shut-off valves are known that are servo-controlled, meaning that they comprise a main valve controlled indirectly via a control valve, are known from the prior art. Opening the control valve relieves a control chamber that is limited by a valve member of the main valve. The valve member is thereby also relieved so that pressure equalization is achieved, which leads to a pneumatic force balance. The main valve can then be opened by means of the spring force of a spring or the magnetic force of a magnetic actuator. The main valve can also be closed using spring force or magnetic force. However, one disadvantage is a generally increased installation space requirement because large strokes must be achieved, which in turn require large and/or a multiple magnetic actuators, so the installation space requirement and costs increase.

The space available in mobile hydrogen tank systems is limited. This applies in particular to hydrogen tank systems comprising pressurized gas tanks having a cylinder neck, into which the shut-off valve is intended to be integrated, because the bottleneck is the most stable and therefore the safest installation location. This requires a shut-off valve featuring a low installation space requirement.

SUMMARY

Therefore, the object of the present invention is to specify a miniaturized shut-off valve for a hydrogen tank system, which enables large strokes using only one magnetic actuator, which is also small, by means of optimized field line routing.

The shutoff valve according to the disclosure is specified in order to achieve this object. Also specified is a hydrogen tank system comprising at least one shut-off valve according to the invention.

Proposed is shut-off valve for hydrogen tank systems, comprising a housing in which an annular solenoid is accommodated for acting on magnetic armature of a control valve in the form of a flat armature and a magnetic armature of a main valve in the form of a plunger-type armature. The two magnetic armatures are in this case arranged coaxially and together border a control chamber formed within the solenoid, which is pneumatically connected to a control valve chamber on one side and to a main valve chamber on the other side. At least one spring for restoring the two magnetic armatures is accommodated in the control chamber.

The proposed shut-off valve is therefore a servo-controlled solenoid valve. The main valve is opened by means of a magnetic force and a pneumatic force, which-upon opening of the control valve-results from changing pressure, and thus force ratios, at the magnetic armature of the main valve. Opening therefore requires a lower magnetic force. In addition, only one solenoid is needed to actuate the control valve and the main valve. As a result installation space can be saved.

The design of the magnetic armature of the main valve as a plunger-type armature is thereby advantageous because the magnetic force of a plunger-type armature decreases less with increasing distance between the magnetic armature and a fixed stroke stop than with flat armature designs. This measure therefore helps to make the magnetic circuit more compact.

The particularly compact design of the proposed shut-off valve enables not only classic installation as a screw-in valve comprising an external solenoid, but also installation in which the solenoid of the shut-off valve is located within the bottleneck of a bottle-shaped compressed gas container. This arrangement is advantageous as the bottleneck features a particularly high level of stability, so the shut-off valve is optimally protected against external influences, e.g. due to an accident.

According to one preferred embodiment of the invention, the magnetic armature in the form of a flat armature is at a circumferential radial distance from the housing. The field lines of the magnetic circuit are thereby predominantly guided through the axial working air gap, which results in a high application of force on the control valve.

It is further proposed that the magnetic armature in the form of a flat armature can form or comprise a control valve piston interacting with a control valve seat. In other words, the control valve piston and the magnetic armature are integrally formed or fixedly connected so that they move together.

Preferably the magnetic armature of the main valve in the form of a plunger-type armature is guided within the solenoid via a guide and the control chamber is connected in a pneumatically throttling manner to the main valve chamber via the guide and/or a flow channel formed in the region of the guide. Guidance can, e.g., be achieved via a pole body or sleeve that is inserted into the solenoid. The pneumatic connection of the control chamber to the main valve chamber via the guide is particularly simple and thus inexpensive to manufacture. At the same time, a throttle point can be easily formed via the guide. The pneumatically throttling connection ensures that when the control valve is open, less gas flows into the control chamber than flows out via the open control valve in order to cause the pressure drop in the control chamber required to actuate the main valve. If—alternatively or additionally—a pneumatically throttling connection is to be made via a flow channel formed in the region of the guide, a longitudinal groove can be provided in the magnetic armature or in the region of the guide, or the magnetic armature can comprise at least one flattened section.

According to a further advantageous embodiment, a sealing element is arranged in the guide region. The pneumatic connection between the control chamber and the main valve chamber necessary for reliable closing the main valve is then preferably achieved via a throttle bore in the magnetic armature. At least one groove or a bevel can also be provided in the magnetic armature instead of the throttle bore. The at least one groove can optionally also be designed as a coil body or housing in the form of the guide.

Furthermore, the magnetic armature in the form of a plunger-type armature preferably has the shape of a cylinder, which further features a geometry and/or an element for forming a stroke stop. The stroke stop limits the maximum stroke of the magnetic armature, so that the latter can be moved back and forth between two defined end positions. The geometry provided for this purpose can, e.g., be in the form of a local thickening in an outer peripheral region of the magnetic armature. Alternatively or additionally, the magnetic armature can, e.g., be connected to an additional element featuring the shape of a ring or sleeve. The element can then be made of a material other than the magnetic armature, in particular of a non-magnetic material, in order to counteract magnetic adhesion of the magnetic armature. Given the shape of a ring or sleeve, the element can simply be placed on the magnetic armature, in particular pressed or screwed on.

In order to ensure the pneumatic connection of the control chamber to the main valve chamber even when the magnetic armature is at full stroke, it is proposed that the stroke stop is designed to be non-sealing. The geometry and/or the element for forming the stroke stop preferably comprises at least one flow channel in a stop surface facing the solenoid for pneumatically connecting the control chamber to the main valve chamber. For example, at least one radially extending flow channel can be formed in the stop surface. Preferably, a plurality of radially extending flow channels are provided at the same angular distance to one another in order to avoid transverse forces acting on the magnetic armature.

The magnetic armature of the main valve in the form of a plunger-type armature is further preferably coupled or can be coupled to a main valve piston for releasing and closing a main valve seat. Ideally, the magnetic armature can disengage from the main valve piston such that the magnetic armature and the main valve piston can move independently of each other. A flow restrictor function can in this way be achieved by means of the main valve piston because the latter only opens when the pressure on the control side has increased to such an extent that the main valve piston is substantially pressure-equalized. In order to ensure reliable opening, it is proposed that, as an additional measure, the main valve piston is biased towards the magnetic armature by the spring force of a spring.

Advantageously, at least two coaxially arranged springs are accommodated in the control chamber comprising a first spring supported on the magnetic armature of the main valve and a second spring supported on the magnetic armature of the control valve. The two magnetic armatures can therefore be restored via separate springs. This enables the magnetic armature of the control valve to be restored using a significantly smaller spring such that a significantly lower spring force must be overcome to open the control valve. In other words, less magnetic force is required, which has a favorable effect on the installation space requirement of the solenoid.

Further preferably, the control valve comprises a down-regulating region that is connected to a down-regulating region of the main valve. When the control valve is opened, the pressure in both down-regulating regions can be increased to such an extent that the pressure, and thus force ratios, at the main valve cause it to open.

Given that a shut-off valve according to the invention is preferably used in a hydrogen tank system, a hydrogen tank system is also proposed comprising at least one compressed gas container and a shut-off valve according to the invention for shutting off the compressed gas container. The hydrogen tank system can be used in particular in a fuel cell vehicle or in a vehicle using hydrogen combustion.

BRIEF DESCRIPTION OF THE DRAWINGS

Preferred embodiments of the invention and the advantages thereof are explained in greater detail hereinafter with reference to the accompanying drawings. Shown are.

DETAILED DESCRIPTION

Figure 1:
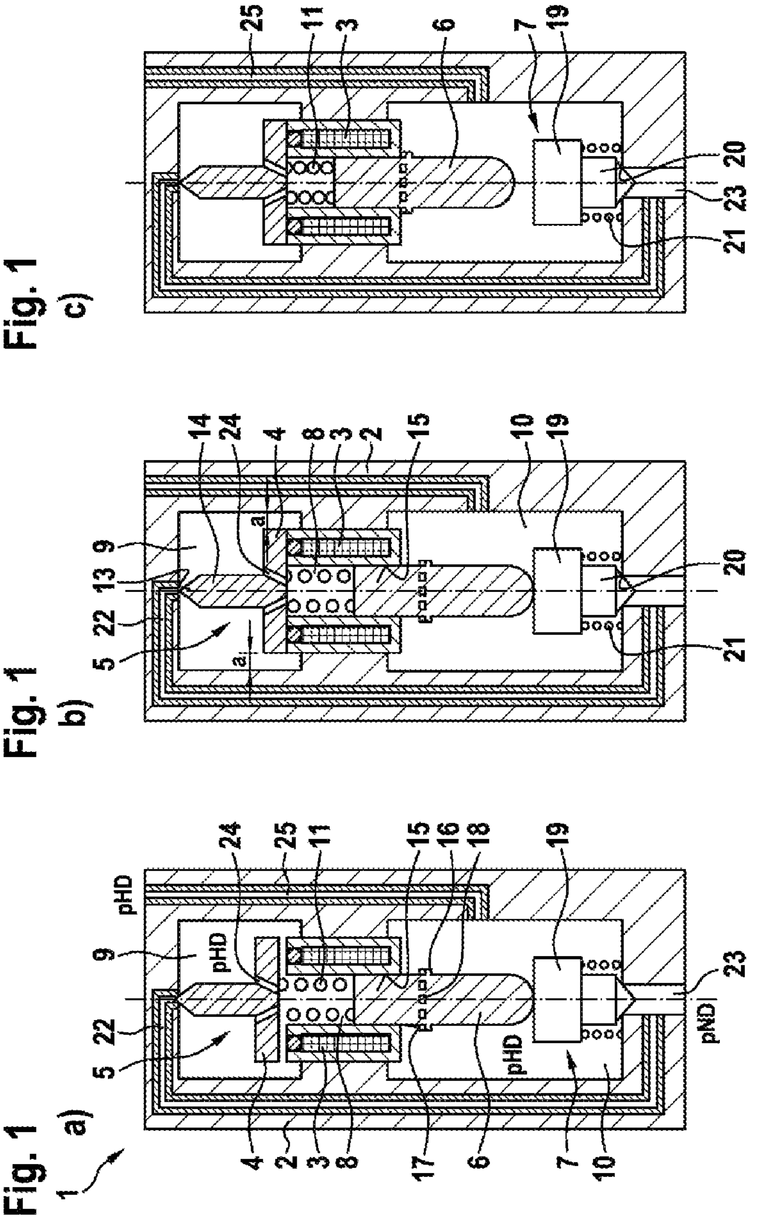
FIGS. 1*a*)-*f*) each a schematic longitudinal section through a first shut-off valve according to the invention in different switching positions, and FIGS. 2*a*)-*f*) each a schematic longitudinal section through a second shut-off valve according to the invention in different switching positions.
Figure 1:
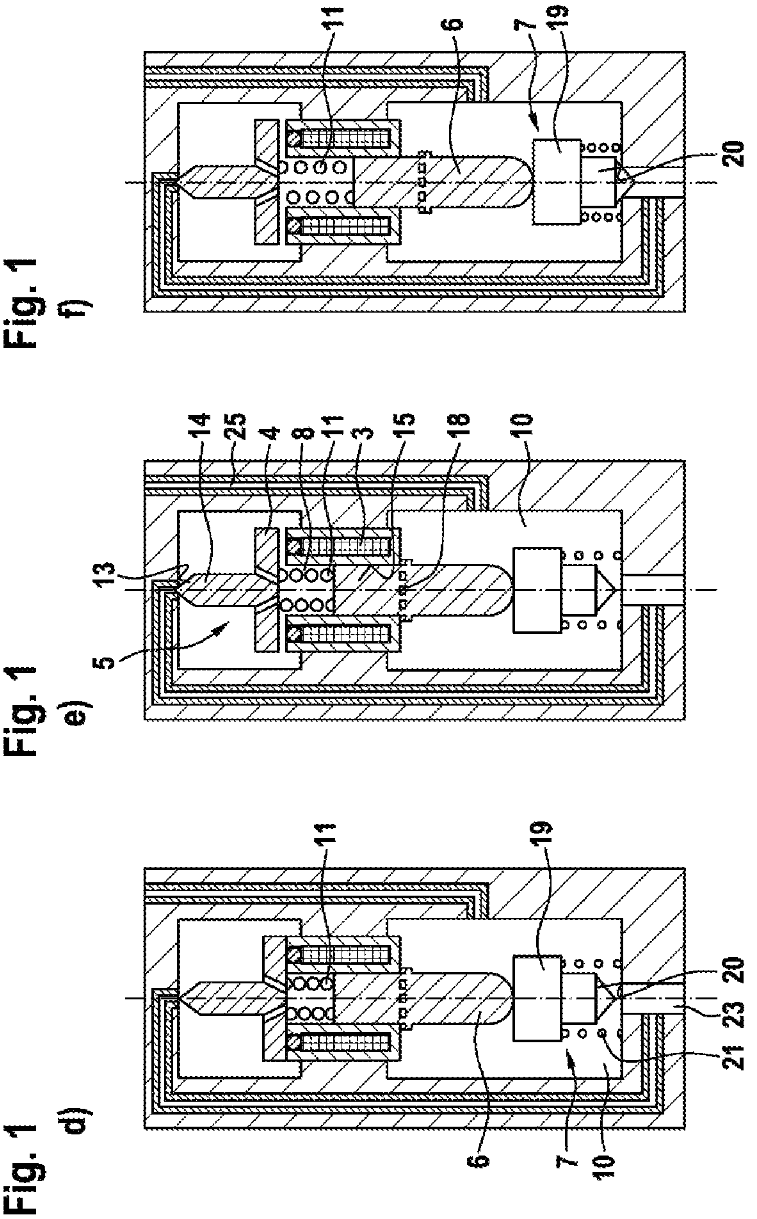

The shut-off valve 1 shown in FIGS. 1*a*)-*f*) comprises a housing 2 in which an annular solenoid 3 is inserted to act on a first magnetic armature 4 and a second magnetic armature 6. The two magnetic armatures 4, 6 are arranged coaxially at an axial distance from one another and move in opposite directions.

The first magnetic armature 4, which is associated with a control valve 5, is in the form of a flat armature. The magnetic armature 4 also forms a control valve piston 14 interacting with a control valve seat 13. Flow-through openings 24 are formed in the magnetic armature 4, which ensure a pneumatic connection between a control valve chamber 9 and a rear control chamber 8 at a full stroke of the magnetic armature 4. The magnetic armature 4 is biased towards the control valve seat 13 by a spring 11.

The second magnetic armature 6, which is associated with a main valve 7, is designed as a plunger-type armature and is guided for stroke movement via a guide 15 formed within the solenoid 3. A geometry provided on the outer peripheral side of the magnetic armature 6 in the form of a local thickening forms a stroke stop 16 comprising a stop surface 17 in which a plurality of flow channels 18 are formed. The stroke stop is therefore non-sealing, so that a pneumatic connection of the rear control chamber 8 to a main valve chamber 10 remains at full stroke of the magnetic armature 6 via the guide 15 and the flow channels 18.

The second magnetic armature 6 can be coupled to a main valve piston 19 that interacts with a main valve seat 20. The magnetic armature 6 and the main valve piston 19 can therefore move independently of each other. In this way, a flow restrictor function is integrated into the main valve 7. In order to reliably open the main valve 7, the main valve piston 19 is biased towards the magnetic armature 6 by a spring 21. The magnetic armature 6 and the main valve piston 19 are restored by the spring 11 accommodated in the control chamber 8.

The control valve 5 and the main valve 7 are connected to the control side via the down-regulating regions 22, 23.

FIG. 1*a*) shows the shut-off valve 1 with the solenoid 3 not energized and consequently in the closed state. Gas flows into the main valve chamber 10 via a high-pressure line 25 such that high-pressure pHD prevails there as well as in control chamber 8 and control valve chamber 9. Low pressure pND prevails in the down-regulating regions 22, 23.

If the solenoid 3 is energized, a magnetic field is generated whose magnetic force moves the magnetic armature 4 of the control valve 5 towards the solenoid 3 (see FIG. 1*b*). Given that the magnetic armature 4 of the control valve 5 is at a radial distance a from the housing 2, the field lines of the magnetic circuit extend predominantly across the axial working air gap such that a high magnetic force acts on the magnetic armature 4, and the control valve 5 can be opened at a low energy demand or using a comparatively small solenoid 3.

When the control valve 5 is open, gas flows from the control valve chamber 9 into the down-regulating region 22. Gas simultaneously flows from the control chamber 8 via the through-flow openings 24 provided in the magnetic armature 4, causing the pressure in the control chamber 8 to drop. This is because more gas flows out via the flow-through openings 24 and the control valve seat 13 than flows in from the main valve chamber 10 via the guide 15. The pressure drop in the control chamber 8 causes the forces acting on the magnetic armature 6 of the main valve 7, consisting of the magnetic force generated by the solenoid 3 and the opening pneumatic forces, to overcome the spring force of the spring 11 so that the magnetic armature 6 is released from the main valve piston 19 and moves towards the solenoid 3 (see FIG. 1*c*). The main valve piston 19 initially still closes the main valve seat 20, as high pressure pHD continues to prevail in the main valve chamber 10 and low pressure pND in the down-regulating region 23. The spring 21 is only able to open the main valve 7 when the pressure in the down-regulating region 23 has increased to such an extent that the main valve piston 19 is largely pressure-equalized (see FIG. 1*d*). When the main valve 7 is in the open position, the pressure is equalized between the main valve chamber 10 and the down-regulating region 23. When the pressure is fully equalized, the main valve 7 and the control valve 5 are held open purely magnetically against the spring force of the spring 11.

To close the shut-off valve 1, the current supply to the solenoid 3 is terminated so that the spring 11 returns the magnetic armature 4 or the control valve piston 14 of the control valve 5 into the control valve seat 13 (see FIG. 1*e*)). When the control valve 5 is closed, the control chamber 8 fills with gas from the main valve chamber 10 via the flow channels 18 and the guide 15 so that the pressure in the control chamber 8 increases again. The same applies to the pressure in the main valve chamber 10, as gas flows in from the high-pressure line 25. As a result, the pneumatic forces acting on the magnetic armature 6 in the closing direction and the spring force of the spring 11 restore the magnetic armature 6 of the main valve 7 to its initial position. The magnetic armature 6 in this case guides the main valve piston 19 so that it is restored into the main valve seat 20 (see FIG. 1*f*)).

One embodiment of the shut-off valve 1 in FIGS. 1*a*)-*f*) can be seen in FIGS. 2*a*)-*f*), which are described hereinafter.

Figure 2:
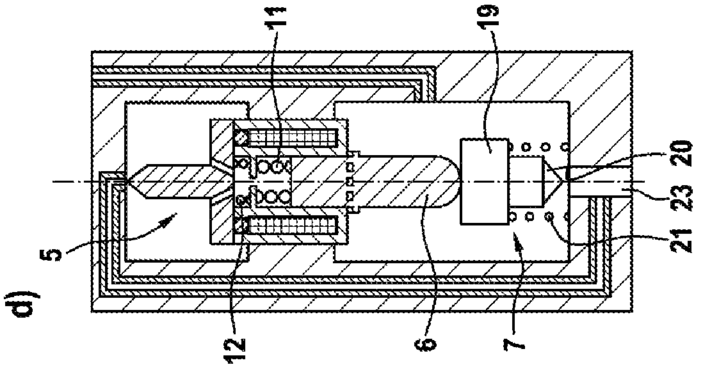
Figure 2:
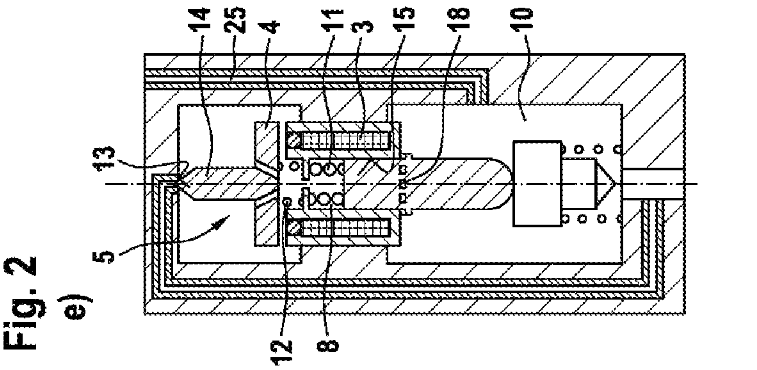
Figure 2:
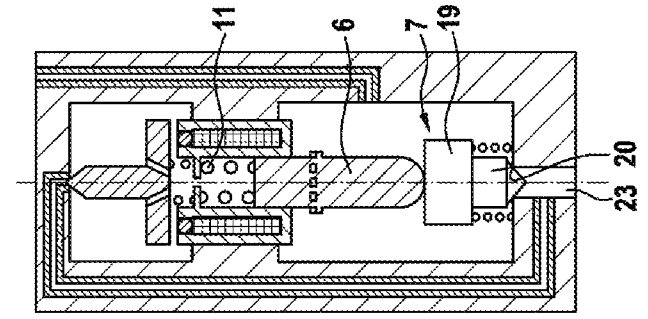

The shut-off valve 1 in FIGS. 2*a*)-*f*) comprises an additional spring 12. Like the spring 11, this spring is accommodated in the control chamber 8 and is used to restore the magnetic armature 4 of the control valve 5. The restoration of the magnetic armature 6 of the main valve 7 is still effected by means of the spring 11. By providing an additional spring 12, a comparatively small spring 12 can be selected so that less force is required to open the control valve 5. Accordingly, opening can be achieved by means of of a smaller solenoid 3, thus saving further installation space.

The operation of the shut-off valve 1 in FIGS. 2*a*)-*f*) *corresponds* to that of the shut-off valve 1 in FIGS. 1*a*)-*f*), so reference is made to the corresponding description.

The invention claimed is:

1. A shut-off valve (1) for hydrogen tank systems, comprising a housing (2) in which an annular solenoid (3) is accommodated for acting on a magnetic armature (4) of a control valve (5) in the form of a flat armature and a magnetic armature (6) of a main valve (7) in the form of a plunger-type armature, wherein the two magnetic armatures (4, 6) are arranged coaxially and together they border a control chamber (8) formed within the solenoid (3), which is pneumatically connected to a control valve chamber (9) on one side and to a main valve chamber (10) on the other side, and wherein at least one spring (11, 12) is accommodated in the control chamber (8) for restoring the two magnetic armatures (4, 6)

wherein the magnetic armature (6) in the form of a plunger-type armature has a shape of a cylinder, which further features a geometry and/or an element for forming a stroke stop (16)

wherein the stroke stop (16) is configured to be non-sealing, wherein the geometry and/or the element for forming the stroke stop (16) is a stop surface (17) facing the solenoid (3), and wherein the stop surface (17) comprises at least one flow channel (18) for pneumatically connecting the control chamber (8) to the main valve chamber (10).

2. The shut-off valve (1) according to claim 1, wherein the magnetic armature (4) in the form of a flat armature is at a circumferential radial distance (a) from the housing (2).

3. The shut-off valve (1) according to claim 1, wherein the magnetic armature (4) in the form of a flat armature forms or comprises a control valve piston (14) interacting with a control valve seat (13).

4. The shut-off valve (1) according to claim 1, wherein the magnetic armature (6) in the form of a plunger-type armature is guided within the solenoid (3) via a guide (15), and the control chamber (8) is connected in a pneumatically throttling manner to the main valve chamber (10) via the guide (15) and/or a flow channel formed in the region of the guide (15).

5. The shut-off valve (1) according to claim 1, wherein the magnetic armature (6) in the form of a plunger-type armature is coupled or can be coupled to a main valve piston (19) for releasing and closing a main valve seat (20).

6. The shut-off valve (1) according to claim 1, wherein at least two coaxially arranged springs (11, 12) are accommodated in the control chamber (8) comprising a first spring (11) supported on the magnetic armature (6) of the main valve (7) and a second spring (12) supported on the magnetic armature (4) of the control valve (5).

7. The shut-off valve (1) according to claim 1, wherein the control valve (5) comprises a down-regulating region (22) that is connected to a down-regulating region (23) of the main valve (7).

8. A hydrogen tank system comprising at least one pressurized gas container and a shut-off valve (1) according to claim 1 for shutting off the at least one pressurized gas container.

9. The shut-off valve (1) according to claim 5, wherein the main valve piston (19) is biased towards the magnetic armature (6) by a spring (21) in the main valve chamber (10).

* * * * *